United States Patent
Slavin (10) Patent No.: US 6,823,091 B2
(45) Date of Patent: Nov. 23, 2004

(54) PIXEL RESAMPLING SYSTEM AND METHOD

(75) Inventor: Keith R. Slavin, Beaverton, OR (US)

(73) Assignee: Micron Technology, Inc., Boise, ID (US)

(*) Notice: Subject to any disclaimer, the term of this patent is extended or adjusted under 35 U.S.C. 154(b) by 659 days.

(21) Appl. No.: 09/760,173

(22) Filed: Jan. 12, 2001

(65) Prior Publication Data

US 2002/0136446 A1 Sep. 26, 2002

(51) Int. Cl.$^7$ .............................. G06K 9/32; G09G 5/00; G09G 5/10
(52) U.S. Cl. ..................... 382/300; 345/606; 345/611; 345/698
(58) Field of Search .................... 345/606, 611, 345/615, 613, 698; 382/167, 279, 299, 300

(56) References Cited

U.S. PATENT DOCUMENTS

| | | | |
|---|---|---|---|
| 4,282,546 A | 8/1981 | Reitmeier | 358/22 |
| 4,578,812 A | 3/1986 | Yui | 382/41 |
| 4,630,307 A | 12/1986 | Cok | 382/25 |
| 5,054,100 A | 10/1991 | Tai | 382/47 |
| 5,703,965 A | 12/1997 | Fu et al. | 382/232 |
| 5,889,894 A * | 3/1999 | Ito et al. | 382/300 |
| 5,930,407 A | 7/1999 | Jensen | 382/300 |
| 5,995,682 A | 11/1999 | Pawlicki et al. | 382/300 |
| 6,018,597 A | 1/2000 | Maltsev et al. | 382/260 |
| 6,535,651 B1 * | 3/2003 | Aoyama et al. | 382/300 |

OTHER PUBLICATIONS

Kochanek, D. and Bartels, R., "Interpolating Splines with Local Tension, Continuity, and Bias Control", ACM Siggraph 1984, vol. 18, No. 3, pp. 33–41.*

Catmull, E. and Rom, R., "A Class of Local Interpolating Splines",in Computer Aided Geometric Design, R. E. B Arnhill and R. Riesenfeld, Eds. New York: Academic, 1974, pp. 317 326.*

Hill, F.S., "Computer Graphics Using OpenGL" © 2001, Prentice–Hall, 2nd Edition, pp. 643–653.*

* cited by examiner

*Primary Examiner*—Amelia M. Au
*Assistant Examiner*—Kevin Siangchin
(74) *Attorney, Agent, or Firm*—Dorsey & Whitney LLP (57) ABSTRACT

A resampling system and method for producing a resampled destination image from a source image by solving coefficients for a cubic polynomial transition model between first and second adjacent source pixels from the sample values of the first and second samples and approximations of the first and second sample gradients at the first and second samples, respectively. Approximations of the first and second color gradients are based on a multiple of first and second color slopes, such as twice the value of the color slope. The first color slope is calculated from the sample values of a previous pixel and the first sample and the second sample slope is calculated from the sample values of a subsequent sample and the second sample. The resulting gradient approximations and sample values are used in the cubic transition model to calculate an output sample value for rendering a resampled destination image.

40 Claims, 3 Drawing Sheets

PIXEL RESAMPLING SYSTEM AND METHOD

TECHNICAL FIELD

The present invention is related generally to the field of computer graphics, and more particularly, a system and method for resampling graphics data of a source image to produce a destination image.

BACKGROUND OF THE INVENTION

As display devices of various sizes and increased resolution have been developed and the demand for them have increased, the ability for a graphics processing system to resize and resample source images and create destination images to take advantage of the various sized and higher resolution displays is a desirable operation. In an electronic display system, color at each pixel is represented by a set of color components, and each color component is represented by a sample value. Color components such as red, green, blue (RGB) or other representations such as $YC_bC_r$ are well known in the art. Whichever representation is chosen, each color component can be interpreted as a two dimensional array of samples, so three such arrays can represent images on display systems. Conceptually, resampling can be viewed as a spatial process, working on discrete input samples, represented by each color component in the source image arranged in a two-dimensional bitmap. The output samples of the destination image are spatially located at fractional sample positions within the input sample grid. Various interpolation and modeling methods are used to construct transition models between samples of the source image from which additional graphics data is produced during the resampling operation.

The additional graphics data is then used to produce larger or higher resolution destination graphics images. However, the resulting destination image must retain an acceptable image quality with respect to the source image. That is, the destination image should appear to retain at least a similar visual qualities of the source image, such as having nearly the same color balance, contrast, and brightness as the original source image. Otherwise, rather than accurately reproducing a larger or higher resolution graphics image of the source image, the resampling operation will compromise image quality by introducing image distortion. To this end, various resampling algorithms have been developed in order to create high quality destination graphics images.

With many conventional resampling algorithms, a transition model between input samples along each axis is constructed to provide output sample values. Generally good results can be obtained with separable processing along each axis for graphics images because image feature cross-sections have the same characteristics when viewed at any angle within the image plane, only at different effective sample rates. The transition models between the input samples are constructed such that the output samples interpolated from the transition model create a destination image that closely resembles the original or source image. The transition models are typically continuous so that an output sample can be generated at any position between the input samples.

Although an axis separable cubic model between two input samples can provide a model with very desirable reconstruction characteristics, generating the models are often cumbersome and result in resampling circuits that include large and complicated circuitry. For example, a linear filtering system, such as a finite impulse response (FIR) filter, may be used to calculate gradients for a cubic model that produces acceptable resampling results. However, the resulting resampling circuit includes multiple stages and taps from which the coefficients of the cubic model are calculated and used to produce interpolated output sample values. Where miniaturization and simplicity of implementation are desired, including such a resampling circuit in the graphics processing system may not be a desirable solution. Moreover, many resampling algorithms are developed with preserving spectral content of the source image in mind, as with the use of linear filters. However, this method may result in destination images that appear blurrier than the source image when viewed at the same size. As mentioned previously, it is not desirable for a resampling operation to produce a destination image having apparent lower quality than the source image.

Therefore, there is a need for an alternate method and system for resampling graphics data of a source image.

SUMMARY OF THE INVENTION

The present invention relates to a resampling system and method for determining an output sample value for a destination pixel located between first and second adjacent source pixels having respective sample values. The resampling system solves coefficients for a cubic polynomial transition model between the first and second adjacent pixels from the sample values of the first and second pixels and approximations of the first and second sample gradients at the first and second pixels, respectively. The approximations of the first and second sample gradients are based on a multiple of first and second sample slopes estimates, such as twice the value of the sample slope. Along one axis, an output sample can be obtained from 4 samples nearest to it, two before, and two after, $f_{p-1}$, $f_p$, $f_{p+1}$, and $f_{p+2}$. The gradient cosited with $f_p$ is initially estimated as $f_p-(f_{p-1})$ and the gradient cosited as $f_{p+1}$ is estimated as $(f_{p+2})-(f_{p+1})$.

Additionally, where the first and second slopes have opposite polarities, the first and second sample gradients may be approximated as being equal to the first and second sample slopes, respectively. An additional third slope may also be calculated from the sample values of the first and second pixels and compared with the first and second slopes for the approximation of the first and second sample gradients. The approximation of the first and second sample gradients are then a multiple, such as two times, of the lesser of the third slope and the respective slope value. Where the first and third slopes have opposite polarities, the first sample gradient may be approximated as being equal to the first slope, and where the second and third slopes have opposite polarities the second sample gradient may be approximated as being equal to the second slope.

DETAILED DESCRIPTION OF THE INVENTION

Embodiments of the present invention provide a method and system for approximating gradients of sample pixels during a resampling operation performed on a source graphics images. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
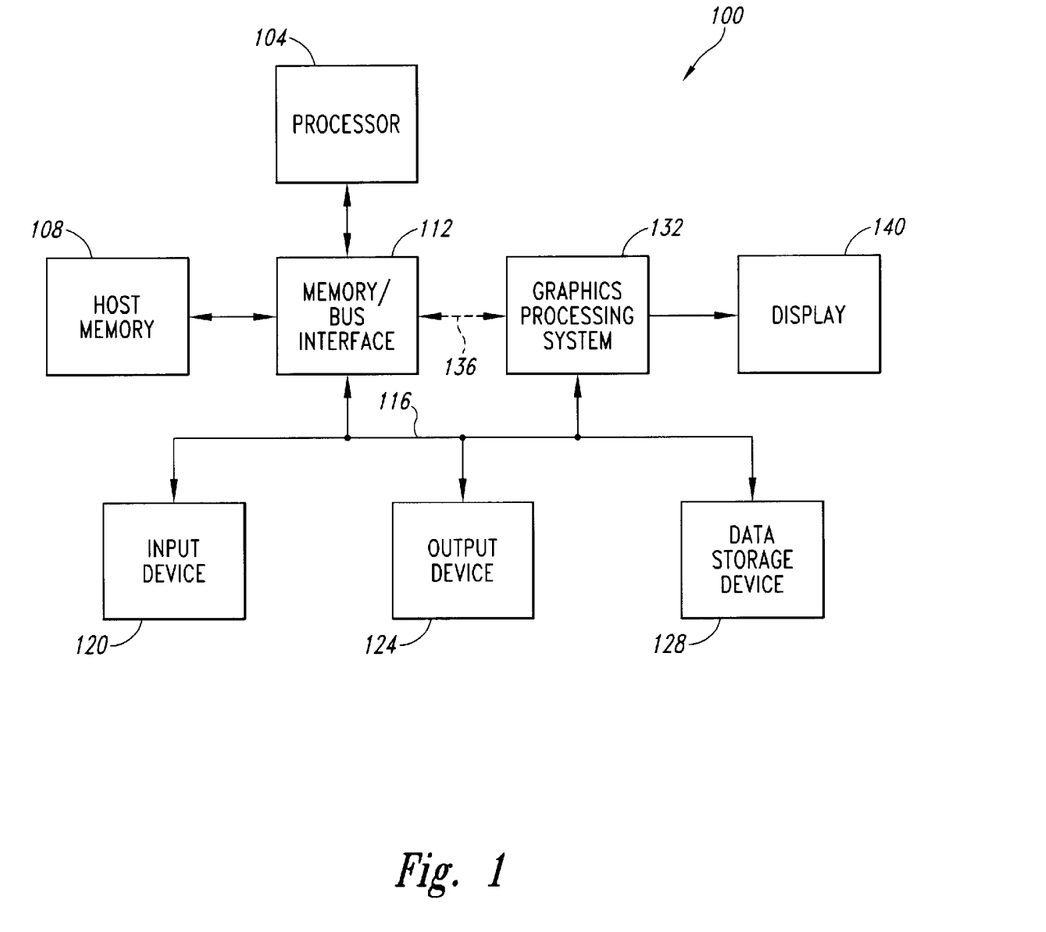
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
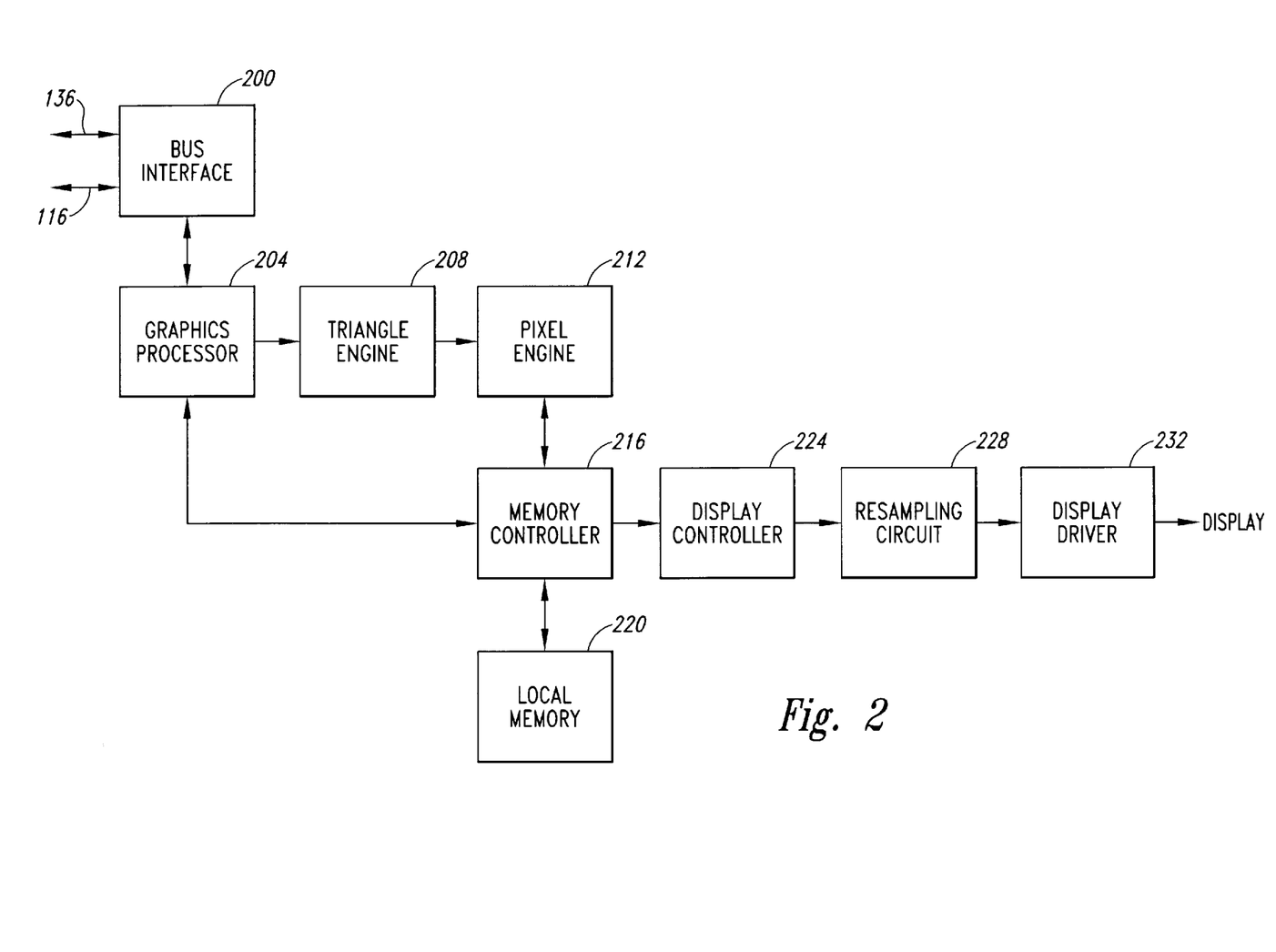
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion. A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. Coupled to the display controller 224 is a resampling circuit 228 that facilitates resizing or resampling graphics images. As will be explained below, embodiments of the resampling circuit 228 perform approximations that simplify the calculation of a model between two sample points for use during resampling. The output color values from the resampling circuit 228 are subsequently provided to a display driver 232 that includes circuitry to provide digital color signals, or convert digital color signals to red, green, and blue analog color signals, to drive the display 140 (FIG. 1).

Although the resampling circuit 228 is illustrated as being a separate circuit, it will be appreciated that the resampling circuit 228 may also be included in one of the aforementioned circuit blocks of the graphics processing system 132. For example, the resampling circuit 228 may be included in the graphics processor 204 or the display controller 224. In other embodiments, the resampling circuit 228 may be included in the display 140 (FIG. 1). Therefore, the particular location of the resampling circuit 228 is a detail that may be modified without deviating from the subject matter of the invention, and should not be used in limiting the scope of the present invention.

Figure 3:
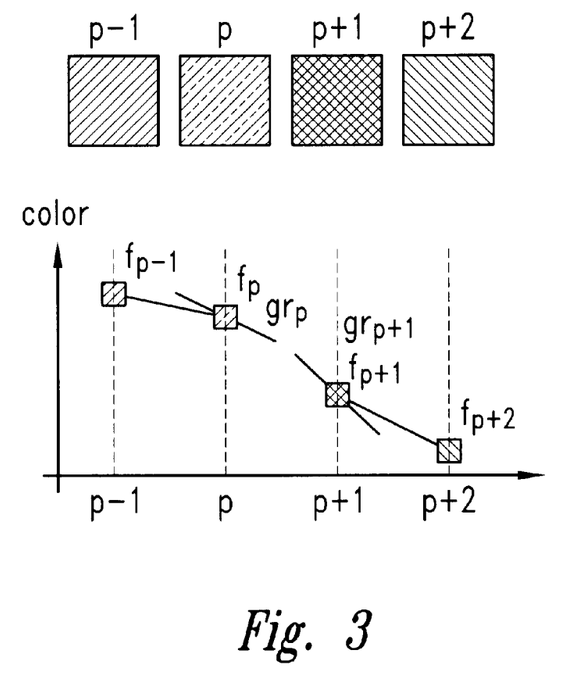
FIG. 3 is a diagram representing a sample of pixel positions for a source image.

Illustrated in FIG. 3 is representation of four pixel positions p−1, p, p+1, and p+2, and the respective sample values $f_{p-1}, f_p, f_{p+1}$, and $f_{p+2}$ of a source image. As mentioned previously, a cubic model may be used between the two input samples p and p+1 to provide a continuous model having desirable reconstruction characteristics for graphics images. As is well known, a cubic model can be solved with four constraints. Two of these constraints may be provided by the color values $f_p$ and $f_{p+1}$ at the two input samples p and p+1. Two additional constraints may be provided by the gradients $gr_p$ and $gr_{p+1}$ at, or cosited with, the two input samples p and p+1.

The resulting cubic model will go through the two input samples p and p+1, and will also allow for transition shaping between the input samples. A piece-wise cubic polynomial model along an axis is defined and will be valid over a fractional input sample position Δp from 0 to 1. Consequently, the model is valid from integer sample position P to P+1:

$$f(P + \Delta p) = \sum_{i=0}^{3} C[P, i](\Delta p)^i$$

To find the gradients cosited with the two input samples, the equation for the cubic model is differentiated with respect to Δp, resulting in:

$$gr(P + \Delta p) = \sum_{i=0}^{3} iC[P, i](\Delta p)^{i-1}$$

Evaluating the two equations at $\Delta p=\{0, 1\}$ and solving for the four coefficients $C[P, i]$ at sample position P results in:

$k_P = f_{P+1} - f_P$ $C[P,3] = gr_{P+1} + gr_P - 2k_P$ $C[P,2] = k_P - C[P,3] - gr_P$ $C[P,1] = gr_P$ $C[P,0] = f_P$

The four coefficients can be reduced because the relative positions of the contributors to the cubic model are of interest, rather than the absolute sample index P. The resulting coefficients are:

$k = f_1 - f_0$ $C_3 = gr_1 + gr_0 - 2k$ $C_2 = k - C_3 - gr_0$ $C_1 = gr_0$ $C_0 = f_0$

For the cubic equation:

$$f(\Delta p) = \sum_{i=0}^{3} C_i(\Delta p)^i$$

The resulting cubic equation, along with the gradients $gr_0$ and $gr_1$ and the sample values $f_0$ and $f_1$ for the two input samples p and p+1 provides a piece-wise continuous model for resampling.

A differentiating FIR filter is conventionally used to obtain the gradients $gr_0$ and $gr_1$ at the two sample points. Consequently, the conventional system and method typically requires complicated circuitry and algorithms to perform the operation. In contrast, embodiments of the present invention use a non-linear algorithm that produces sharper images (i.e., have less ringing) compared with conventional filters, but may have lower image quality for images having spectral content, such as zone-plate test signals. Nevertheless, the benefits resulting from the simplicity and processing speed afforded by the present invention make it a desirable alternative to conventional methods.

Figure 4:
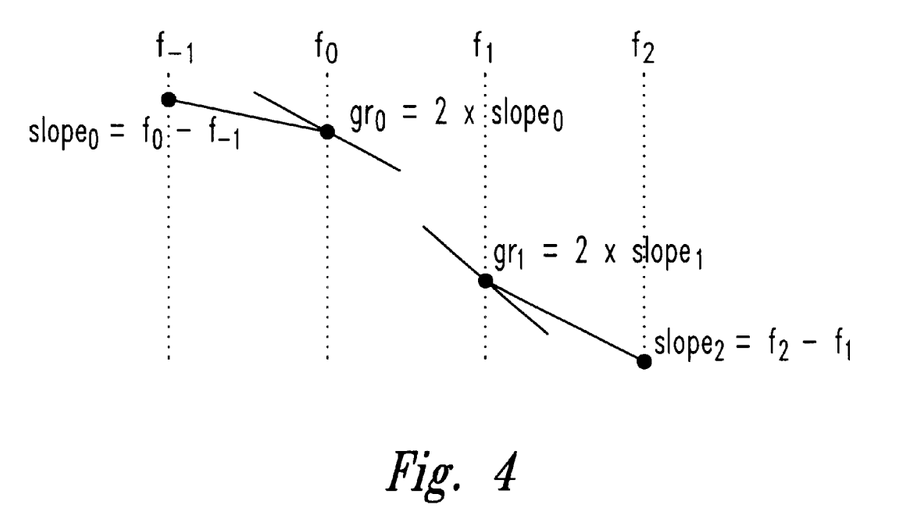
FIG. 4 is a diagram representing a sample of pixels in the source image.

Embodiments of the present invention approximate the gradient values for the sample points between which the model is calculated from the gradient value of a line segment intersecting an input samples and its respective neighbor sample. Thus, only four samples are used by the resampling circuit 228 (FIG. 2) in the approximation of the gradients $gr_0$ and $gr_1$. As illustrated in FIG. 4:

$slope_0 = f_0 - f_{-1}$ $slope_2 = f_2 - f_1$

Where $slope_0$ is used to approximate the gradient $gr_0$ and $slope_2$ is used to approximate gradient $gr_1$. Embodiments of the present invention approximate the gradient values $gr_0$ and $gr_1$ cosited with the two input samples $f_0$ and $f_1$ as being roughly twice the value of $slope_0$ and $slope_2$, respectively. That is, $gr_0 = 2 * slope_0$; and $gr_1 = 2 * slope_2$.

Although embodiments of the present invention use an approximated gradient value, the approximation produces a close estimate of the steepest slope within a transition between two input samples. Also, single sample-period transitions occur in video signals (due to noise or low-pass filter leakage), but they should be small enough that the resulting algorithm edge placement has no significant visible effect. The gradient approximation results in a model having an edge placed nearly in the correct position without actually having to calculate the center position of the edge. Moreover, the gradient calculations for $gr_0$ and $gr_1$ are simple, and consequently, the algorithm is very easy to implement. For example, multiplying the $slope_0$ or $slope_2$ by a factor of two may be performed by a bit shift of a binary value representing the slope value. It will be appreciated that this operation may be performed in software or through hardware implementation, and the particular method of implementation should not be interpreted as limiting the scope of the present invention.

The gradient approximation of embodiments of the present invention can result in a slight over-emphasis of gradients when the values of $slope_0$ and $slope_2$ are opposite in polarity. However, this can be easily remedied using the following test (as written in C):

```
if(((slope0 < 0) && (slope2 > 0)) ||
   ((slope0 > 0) && (slope2 < 0)))
{
   gr0 = slope0;
   gr1 = slope2;
}
else
{
   gr0 = 2 * slope0;
   gr1 = 2 * slope2;
}
```

The resulting cubic model is less relatively accurate at any shallow area near a large transition, however, such errors at a shallow gradient are generally not noticeable in the resampled graphics image. Additionally, although the approximation is very non-linear in its spectral behavior at high frequencies, the resulting resampled image nevertheless maintains good image quality.

The previously described gradient approximation produces quality graphics images, but some small overshoot problems may appear at sharp transitions which can be visible at sharp boundaries between graphics data representing different types of graphics images, such as text and video. An alternative embodiment of the present invention improves upon the behavior of the previously described embodiments by making use of an additional central $slope_1 = f_1 - f_0$. We compare $slope_1$ with $slope_0$ to find the smaller of the two slopes and double the resulting value to approximate the gradient $gr_0$ at sample $f_0$. Similarly, this process may be performed independently using $slope_1$ and $slope_2$ to determine the gradient value $gr_1$ for sample $f_1$. Where $slope_0$ and $slope_1$ are of opposite sign, such as due to a narrow feature or peak, or from ringing in the source material near transitions, the gradient at $f_1$ is made equal to $slope_0$ that is, the slope furthest from the model interval from f0 to $f_1$. As a result, narrow features are slightly emphasized.

The gradient approximation method according to the alternative embodiment may be described as follows, as written in C code:

```
/* obtain gr0 using slope0 and slope1 */
if((slope0 > 0) && (slope1 > 0))
    {
        if(slope0 < slope1)
            gr0 = slope0 * 2; /* *2 is trivial hardware
shift */
        else
            gr0 = slope1 * 2;
    }
else if((slope0 < 0) && (slope1 < 0))
    {
        if(slope0 < slope1)
            gr0 = slope1 * 2;
        else
            gr0 = slope0 * 2;
    }
else
    gr0 = slope0;
/* obtain gr1 using slope1 and slope2 */
if((slope1 > 0) && (slope2 > 0))
    {
        if(slope1 < slope2)
            gr1 = slope1 * 2;
        else
            gr1 = slope2 * 2;
    }
else if((slope1 < 0) && (slope2 < 0))
    {
        if(slope1 < slope2)
            gr1 = slope2 * 2;
        else
            gr1 = slope1 * 2;
    }
else
    gr1 = slope2;
```

The resulting approximated gradient values produce resampled images having good image quality. An additional benefit from including the calculation of and comparison with $slope_1$ is that the slopes of the gradients $gr_0$ and $gr_1$ are kept as shallow as possible near transitions, which causes the transition itself to be steeper. Additionally, $slope_1$ is preserved and can be used to calculate the gradient values for the next sample points $f_1$ and $f_2$ as we transition to the next piece-wise continuous model.

The description of the resampling circuit 228 as provided herein is sufficient for one of ordinary skill in the art to practice the invention. The resampling circuit 228 includes conventional logic that is well understood and may be implemented without undue experimentation. Consequently, detailed description of the circuitry of the resampling circuit 228 has been omitted for the sake of brevity.

As mentioned previously, the transition model between input samples can be constructed along each axis to provide output samples for a resampled graphics image. Thus, although not specifically discussed herein, it will be appreciated that embodiments of the present invention perform the gradient approximation along each axis of a source image when performing the resampling operation. Additionally, it will be appreciated that the color values of the sample pixels consist of several color components. For example, the color values of the source and destination pixels may be the combination of red, green, and blue color components. Consequently, the invention may be practiced for multi-component color values although it has not been described in detail because multi-component color values and image processing of the same is well understood by one of ordinary skill in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for determining an output color value for a destination pixel located between first and second adjacent source pixels having respective color values, the method comprising:

calculating a first color slope between the color value of a previous pixel and the color value of the first pixel;

calculating a second color slope between the color value of a subsequent pixel and the color value of the second pixel;

determining whether the first and second slopes have opposite polarities:

where the polarities are opposite, approximating first and second color gradients cosited with the first and second pixels as being equal to the first and second color slopes, respectively;

otherwise, approximating the first and second color gradients as being equal to twice the first and second color slopes, respectively;

solving coefficients for a cubic polynomial transition model between the first and second adjacent pixels from the color values of the first and second pixels and the approximations of the first and second color gradients; and determining an output color value from the cubic model to render a resampled destination image.

2. The method of claim 1 wherein approximating the first and second color gradients as being equal to twice the first and second color slopes comprises shifting a binary value representing the color slopes left one bit.

3. The method of claim 1 wherein calculating first and second color slopes, approximating and solving are repeated along two orthogonal axes to determine the output color value.

4. The method of claim 1 wherein solving coefficients of the transition model comprises solving:

$k = f_1 - f_0,$ $C_3 = gr_1 + gr_0 - 2k,$ $C_2 = k - C_3 - gr_0,$ $C_1 = gr_0,$ and $C_0 = f_0,$ where $f_0$ represents the first color value, $f_1$ represents the second color value, $gr_0$ represents the first color gradient, and $gr_1$ represents the second color gradient.

5. A method for determining an output color value for a destination pixel located between first and second adjacent source pixels having respective color values, the method comprising:

calculating a first color slope between the color value of a previous pixel and the color value of the first pixel;

calculating a second color slope between the color value of a subsequent pixel and the color value of the second pixel;

calculating a third color slope between the color values of the first and second pixel;

approximating a first color gradient cosited with the first pixel as twice the lesser of the first and third slopes and a second color gradient cosited with the second pixel as twice the lesser of the second and third slopes;

solving coefficients for a cubic polynomial transition model between the first and second adjacent pixels from the color values of the first and second pixels and the approximations of the first and second color gradients; and determining an output color value from the cubic model to render a resampled destination image.

6. The method of claim 5 wherein calculating first, second, and third color slopes, approximating and solving are repeated along two orthogonal axes to determine the output color value.

7. The method of claim 5 wherein solving coefficients of the transition model comprises solving:

$$k = f_1 - f_0,$$
$$C_3 = gr_1 + gr_0 - 2k,$$
$$C_2 = k - C_3 - gr_0,$$
$$C_1 = gr_0, \text{ and}$$
$$C_0 = f_0,$$

where $f_0$ represents the first color value, $f_1$ represents the second color value, $gr_0$ represents the first color gradient, and $gr_1$ represents the second color gradient.

8. A method for determining an output color value for a destination pixel located between first and second adjacent source pixels having respective color values, the method comprising:

calculating a first color slope between the color value of a previous pixel and the color value of the first pixel;

calculating a second color slope between the color value of a subsequent pixel and the color value of the second pixel;

calculating a third color slope between the color values of the first and second pixel;

determining whether the first and third slopes have opposite polarities;

determining whether the second and third slopes have opposite polarities;

approximating a first color gradient cosited with the first pixel as being equal to the first slope where the polarities of the third slope and the first slope are opposite, and approximating a second color gradient cosited with the second pixel as being equal to the second slope where the polarities of the third slope and the second slope are opposite;

solving coefficients for a cubic polynomial transition model between the first and second adjacent pixels from the color values of the first and second pixels and the approximations of the first and second color gradients; and determining an output color value from the cubic model to render a resampled destination image.

9. The method of claim 8 wherein calculating first, second, and third color slopes, approximating and solving are repeated along two orthogonal axes to determine the output color value.

10. The method of claim 8 wherein solving coefficients of the transition model comprises solving:

$$k = f_1 - f_0,$$
$$C_3 = gr_1 + gr_0 - 2k,$$
$$C_2 = k - C_3 - gr_0,$$
$$C_1 = gr_0, \text{ and}$$
$$C_0 = f_0,$$

where $f_0$ represents the first color value, $f_1$ represents the second color value, $gr_0$ represents the first color gradient, and $gr_1$ represents the second color gradient.

11. A method for determining an output sample value for a destination pixel located between first and second adjacent source pixels having respective sample values, the method comprising:

calculating a first sample slope between the sample values of a previous pixel and the first pixel;

calculating a second sample slope between the sample values of a subsequent pixel and the second pixel;

calculating a third sample slope between the sample values of the first and second pixels;

approximating first and second sample gradients cosited with the first and second pixels, the first sample gradient approximated by multiplying the lesser of the first and third sample slopes by two and the second sample gradient approximated by multiplying the lesser of the second and third sample slopes by two;

solving coefficients for a cubic polynomial transition model between the first and second adjacent pixels from the sample values of the first and second pixels and the approximations of the first and second sample gradients; and determining an output sample value from the cubic model to render a resampled destination image.

12. The method of claim 11 wherein red, blue and green color components are each processed separately as a frame of samples.

13. The method of claim 11 wherein calculating first, second, and third sample slopes, approximating and solving are repeated along two orthogonal axes to determine the output sample value.

14. The method of claim 11 wherein multiplying the lesser of the first and third sample slopes by two and multiplying the lesser of the second and third sample slopes by two comprise shifting a binary value representing the sample slopes left by one bit position.

15. The method of claim 11 wherein solving coefficients of the transition model comprises solving:

$$k = f_1 - f_0,$$
$$C_3 = gr_1 + gr_0 - 2k,$$
$$C_2 = k - C_3 - gr_0,$$
$$C_1 = gr_0, \text{ and}$$
$$C_0 = f_0,$$

where $f_0$ represents the first color value, $f_1$ represents the second color value, $gr_0$ represents the first sample gradient, and $gr_1$ represents the second sample gradient.

16. A method for determining an output sample value for a destination pixel located between first and second adjacent source pixels having respective sample values, the method comprising:

calculating a first sample slope between the sample values of a previous pixel and the first pixel;

calculating a second sample slope between the sample values of a subsequent pixel and the second pixel;

calculating a third sample slope between the sample values of the first and second pixels;

determining whether the first and third slopes have opposite polarities;

determining whether the second and third slopes have opposite polarities;

approximating the first sample gradient cosited with the first pixel as being equal to the first slope where the polarities of the third slope and the first slope are opposite, and approximating the second sample gradient cosited with the second pixel as being equal to the second slope where the polarities of the third slope and the second slope are opposite;

solving coefficients for a cubic polynomial transition model between the first and second adjacent pixels from the sample values of the first and second pixels and the approximations of the first and second sample gradients; and determining an output sample value from the cubic model to render a resampled destination image.

17. The method of claim 16 wherein red, blue and green color components are each processed separately as a frame of samples.

18. The method of claim 16 wherein calculating first, second, and third sample slopes, approximating and solving are repeated along two orthogonal axes to determine the output sample value.

19. The method of claim 16 wherein solving coefficients of the transition model comprises solving:

$k = f_1 - f_0$, $C_3 = gr_1 + gr_0 - 2k$, $C_2 = k - C_3 - gr_0$, $C_1 = gr_0$, and $C_0 = f_0$, where $f_0$ represents the first color value, $f_1$ represents the second color value, $gr_0$ represents the first sample gradient, and $gr_1$ represents the second sample gradient.

20. A resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, determining whether the first and second slopes have opposite polarities, and where the polarities are opposite, approximating first and second sample gradients at the first and second samples as being equal to the first and second sample slopes, respectively, otherwise approximating the first and second color gradients as being equal to twice the first and second color slopes, respectively, solving coefficients for a cubic polynomial transition model between the first and second adjacent samples from the sample values of the first and second samples and the approximations of the first and second sample gradients, and determining an output sample value from the cubic model to render a resampled destination image.

21. The resampling circuit of claim 20 adapted to approximate the first and second color gradients as being equal to twice the first and second color slopes, respectively, by shifting a binary value representing the sample slopes left one bit to multiply the sample slopes by two.

22. The resampling circuit of claim 20 wherein the color values comprise red, blue and green color components.

23. The resampling circuit of claim 20, further adapted to calculate first and second sample slopes, approximate first and second sample gradients, and solve coefficients of the transition model along two orthogonal axes to determine the output sample value.

24. A resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second sample, approximating a first sample gradient at the first sample as twice the lesser of the first and third slopes and a second sample gradient at the second sample as twice the lesser of the second and third slopes, solving coefficients for a cubic polynomial transition model between the first and second adjacent samples from the sample values of the first and second samples and the approximations of the first and second sample gradients, and determining an output sample value from the cubic model to render a resampled destination image.

25. The resampling circuit of claim 24 adapted to approximate the first and second sample gradients by shifting a binary value representing the sample slopes left one bit to multiply the sample slopes by two.

26. The resampling circuit of claim 24 wherein the sample values comprise red, blue and green color components.

27. The resampling circuit of claim 24, further adapted to calculate first, second, and third sample slopes, approximate first and second sample gradients, and solve coefficients of the transition model along two orthogonal axes to determine the output sample value.

28. A resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second sample, determining whether the first and third slopes have opposite polarities and whether the second and third slopes have opposite polarities, and approximating a first sample gradient at the first sample as being equal to the first slope where the polarities of the third slope and the first slope are opposite, and approximating a second sample gradient at the second sample as being equal to the second slope where the polarities of the third slope and the second slope are opposite, solving coefficients for a cubic polynomial transition model between the first and second adjacent samples from the sample values of the first and second samples and the approximations of the first and second sample gradients, and determining an output sample value from the cubic model to render a resampled destination image.

29. The resampling circuit of claim 28 wherein the sample values comprise red, blue and green color components.

30. The resampling circuit of claim 28, further adapted to calculate first, second, and third sample slopes, approximate first and second sample gradients, and solve coefficients of the transition model along two orthogonal axes to determine the output sample value.

31. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a resampling circuit coupled to the graphics processor and the display logic and adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, determining whether the first and second slopes have opposite polarities, and where the polarities are opposite, approximating first and second sample gradients at the first and second samples as being equal to the first and second sample slopes respectively, otherwise approximating the first and second sample gradients as being equal to twice the first and second color slopes, respectively, solving coefficients for a cubic polynomial transition model between the first and second adjacent samples from the sample values of the first and second samples and the approximations of the first and second sample gradients, and determining an output sample value from the cubic model to render a resampled destination image.

32. The graphics processing system of claim 31 wherein the resampling circuit is adapted to approximate the first and second sample gradients as being equal to twice the first and second color slopes, respectively, by shifting a binary value representing the sample slopes left one bit to multiply the first and second sample slopes by two.

33. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second pixel, approximating a first sample gradient at the first sample as twice the lesser of the first and third slopes and a second sample gradient at the second sample as twice the lesser of the second and third slopes, solving coefficients for a cubic polynomial transition model between the first and second adjacent samples from the sample values of the first and second samples and the approximations of the first and second sample gradients, and determining an output sample value from the cubic model to render a resampled destination image.

34. The graphics processing system of claim 33 wherein the resampling circuit is adapted to approximate the first and second sample gradients by shifting a binary value representing the sample slopes left one bit.

35. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second sample, determining whether the first and third slopes have opposite polarities and whether the second and third slopes have opposite polarities, and approximating a first sample gradient at the first sample as being equal to the first slope where the polarities of the third slope and the first slope are opposite, and approximating a second sample gradient at the second sample as being equal to the second slope where the polarities of the third slope and the second slope are opposite, solving coefficients for a cubic polynomial transition model between the first and second adjacent samples from the sample values of the first and second samples and the approximations of the first and second sample gradients, and determining an output sample value from the cubic model to render a resampled destination image.

36. A computer system, comprising:

a system processor;

a system bus coupled to the system processor;

a system memory coupled to the system bus; and a graphics processing system coupled to the system bus, the graphics processing system, comprising:

a bus interface for coupling to the system bus;

a graphics processor coupled to the bus interface to process graphics data;

address and data busses coupled to the graphics processor to transfer address and graphics data to and from the graphics processor;

display logic coupled to the data bus to drive a display; and a resampling circuit coupled to the graphics processor and the display logic and adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, determining whether the first and second slopes have opposite polarities, and where the polarities are opposite, approximating first and second sample gradients at the first and second samples as being equal to the first and second sample slopes, respectively, otherwise approximating the first and second color gradients as being equal to twice the first and second sample slopes, respectively, solving coefficients for a cubic polynomial transition model between the first and second adjacent samples from the sample values of the first and second samples and the approximations of the first and second sample gradients, and determining an output sample value from the cubic model to render a resampled destination image.

37. The computer system of claim 36 wherein the resampling circuit of the graphics processing system is adapted to approximate the first and second sample gradients as being equal to twice the first and second color slopes, respectively, by shifting a binary value representing the sample slopes left one fit to multiply the first and second sample slopes by two.

38. A computer system, comprising:

a system processor;

a system bus coupled to the system processor;

a system memory coupled to the system bus; and a graphics processing system coupled to the system bus, the graphics processing system, comprising:
   a bus interface for coupling to the system bus;
   a graphics processor coupled to the bus interface to process graphics data;
   address and data busses coupled to the graphics processor to transfer address and graphics data to and from the graphics processor;
   display logic coupled to the data bus to drive a display; and
   a resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second samples, approximating a first sample gradient at the first sample as twice the lesser of the first and third slopes and a second sample gradient at the second sample as twice the lesser of the second and third slopes, solving coefficients for a cubic polynomial transition model between the first and second adjacent samples from the sample values of the first and second samples and the approximations of the first and second sample gradients, and determining an output sample value from the cubic model to render a resampled destination image.

39. The computer system of claim 38 wherein the resampling circuit of the graphics processing system is adapted to approximate the first and second sample gradients by shifting a binary value representing the sample slopes left one bit.

40. A computer system, comprising:

a system processor;

a system bus coupled to the system processor;

a system memory coupled to the system bus; and a graphics processing system coupled to the system bus, the graphics processing system, comprising:
   a bus interface for coupling to the system bus;
   a graphics processor coupled to the bus interface to process graphics data;
   address and data busses coupled to the graphics processor to transfer address and graphics data to and from the graphics processor;
   display logic coupled to the data bus to drive a display; and
   a resampling circuit adapted to receive signals representing respective sample values for a previous sample, first and second adjacent samples, and a subsequent sample, the resampling circuit calculating a first sample slope from the sample values of the previous and first pixels, calculating a second sample slope from the sample value of the subsequent and second sample, calculating a third sample slope from the sample values of the first and second sample, determining whether the first and third slopes have opposite polarities and whether the second and third slopes have opposite polarities, and approximating a first sample gradient at the first sample as being equal to the first slope where the polarities of the third slope and the first slope are opposite, and approximating a second sample gradient at the second sample as being equal to the second slope where the polarities of the third slope and the second slope are opposite, solving coefficients for a cubic polynomial transition model between the first and second adjacent samples from the sample values of the first and second samples and the approximations of the first and second sample gradients, and determining an output sample value from the cubic model to render a resampled destination image.

* * * * *